March 20, 1956 — R. P. WOOLLEY ET AL — 2,739,212
HIGH RANGE STRAIN GAGE
Filed Aug. 11, 1953
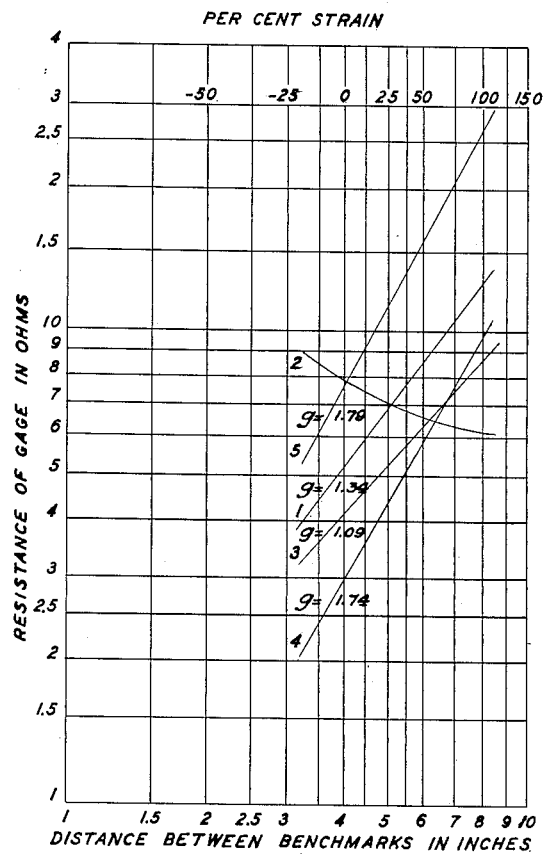
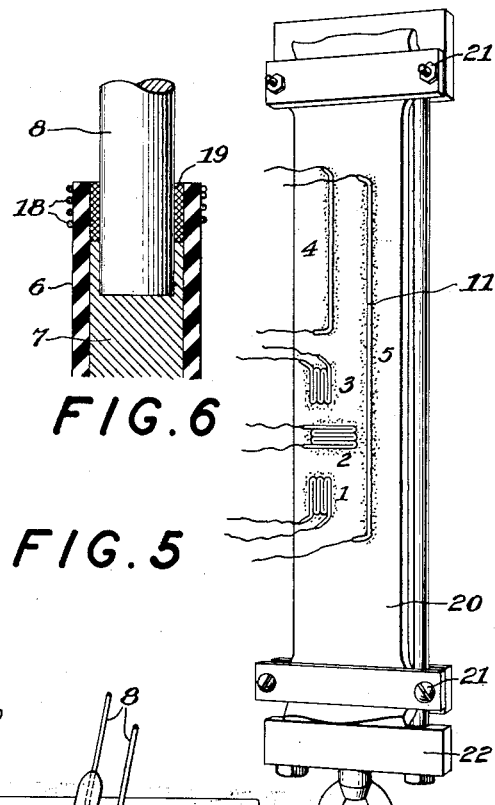
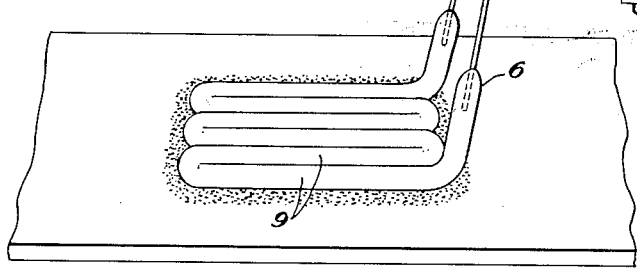
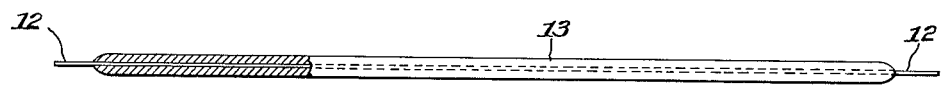
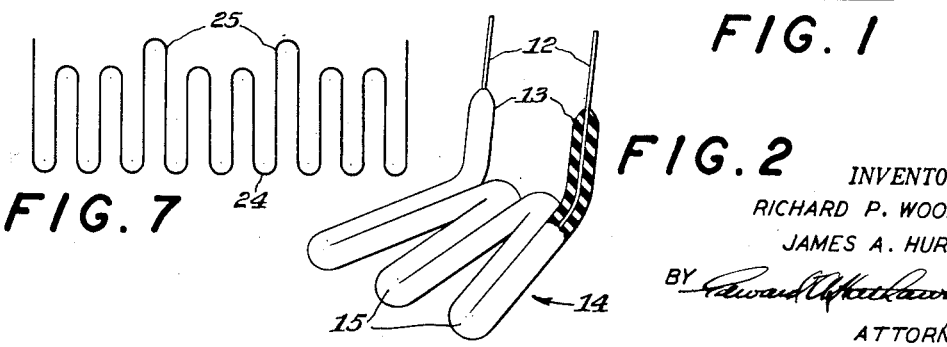
INVENTORS
RICHARD P. WOOLLEY
JAMES A. HURRY
BY
ATTORNEY United States Patent Office 2,739,212
Patented Mar. 20, 1956

2,739,212

HIGH RANGE STRAIN GAGE

Richard P. Woolley, Jackson Heights, N. Y., and James A. Hurry, Denver, Colo., assignors to The Gates Rubber Company, a corporation of Colorado Application August 11, 1953, Serial No. 373,617

1 Claim. (Cl. 201—63)

This invention relates to high range strain gages of the electrical resistance type and to a method of making the same.

In recent years experimental stress analysis has increased in importance until now few machines are designed without its direct application and nearly all products benefit at least indirectly by its use. A large number of techniques have been developed for the measurement of strains in structures. These techniques include the use of mechanical and optical strain gages, photoelasticity, and brittle lacquers, but the most versatile instrument yet devised for the measurement of strain is the bonded electrical resistance wire strain gage.

A bonded gage has certain disadvantages when applied to specimens such as rubber or other plastics or materials in which elongations are encountered far greater than is possible with the elastic properties of the bonded wire and also because the modulus of elasticity of the bonded wire is so much higher than that of rubber that the presence of the wire gage on a rubber specimen very seriously modifies the stress distribution in the rubber specimen.

It is an object of our invention to provide an improved type of electrical resistance strain gage that has extraordinary elongation combined with a high degree of accuracy, sensitivity and ease of application as well as many desirable features of the resistance wire gage.

A further object is to provide an improved electrical resistance strain gage of the foregoing type that is relatively simple and economical in construction and operation and that has a high degree of flexibility of use.

Another object is to provide a method for making our gage in a relatively simple but highly effective manner.

In accomplishing the foregoing as well as further objects of our invention we have provided a novel gage having an elastic tube filled with mercury and have provided a unique method for forming the same.

Other objects and advantages will be more apparent to those skilled in the art from the following description of the accompanying drawings in which:

Fig. 1 is a partially broken away view of the initial step in the formation of our gage in which a core wire is insulated with raw rubber;

Fig. 2 is a further step showing in perspective the material of Fig. 1 bent and shaped to a desired form of gage ready to have its raw rubber cured;

Fig. 3 is a perspective of the completed gage applied to a specimen;

Fig. 4 is a perspective of several types of gages applied to a rubber specimen shown under tension;

Fig. 5 shows diagrams illustrating the relation of strain to electrical resistance of our gage in operation;

Fig. 6 is an enlarged fragmentary sectional view of a lead wire secured in the mercury filled tube; and Fig. 7 diagrammatically illustrates how several gages could be made in a single operation.

Our gage consists of an elongated tube 6 of elastic electrically non-conducting material, preferably rubber, of suitable length such, of example, as 3 to 6 inches with an inside diameter of four to eight thousandths of an inch and filled with an electrically conducting liquid, preferably mercury 7. Electrical connections are made to the mercury column by means of lead wires 8, which also seal the ends of the tube. The tube may be folded back and forth on itself as at 9 in the form of a grid or it may be used as a single strand 11 or made in any other suitable shape. Changes in the electrical resistance of the mercury column in response to elongation of the tube constitute a measure of strain and any usual bridge or other suitable resistance measuring instrumentation may be used for the measuring operation. Under certain applications the tube might be secured at its ends to a member subject to extension or the tube may be, as is usually the case, bonded throughout its effective length to a specimen under test.

The material of the tube can be of any suitable elastic substance such as natural gum rubber having a high extension of 600–700 percent although most compounded polymers, natural and synthetic rubbers, would be suitable as they would provide 400–500 percent extension. However, extension is not as important as the ability of the material to be formed into a very fine bore tube and for this reason plastics such, for example, as Geon could also be used. It is also desirable that the material does not have a sulfur cure as the sulfur will contaminate the mercury column. For this reason the rubber stock we have employed in making gages embodying our invention used the Tuads cure.

The steps in the method of constructing our gage consists first, as shown in Fig. 2, in taking a fine steel wire 12 and lubricating it with silicone oil and then insulating it with a cylindrical cover of raw rubber 13. We have used wire of 3 mils diameter although any other diameter may be used that will produce a mercury column having desired strain vs. electrical resistance characteristics. The insulated wire is then bent generally to whatever shape of finished gage is desired, one form of which is shown, for example, at 14 in Fig. 2, and the rubber is then vulcanized in any usual and well known manner which in our particular case was in open steam or, if other material is used, it is cured or treated in accordance with methods suitable for its characteristics. After vulcanization the wire is removed from the rubber as by being pulled therefrom which can be readily done by working the cured rubber tube off the wire. This sometimes requires slight working around the bends although the bends can be slightly straightened for this purpose. The tube will immediately resume its cured folded shape when the wire is removed. A tube is thus produced of very uniform bore even at the sharp bends 15. The tube is now held in its original shape and filled with mercury 7 through a glass tube drawn to capillary size, whereupon the ends of the tube are plugged with amalgamated copper lead wires 8. These wires, as shown in Fig. 6, are tied in place as at 18 or they may be covered with rubber cement 19 before being inserted into the tube ends. The tube is then cemented into place on a structure or specimen to be tested, or it can be built internally of and cured within a structure in which case the ends protrude from the structure and the wire is removed by being drawn around the bends if the tube is folded. Several types of completed gages are shown in place at 1–5, Fig. 4, on a flat rubber tension specimen 20 which is held by clamps 21 of a tensioning frame 22.

In Fig. 7 several gages can be made in gang fashion by making a long tubular ribbon 24 in which certain loops are extended as at 25 which will be cut to form separate gages between the adjacent extensions.

Wherever reference is made to cementing the tube or lead wires, any suitable cement may be used such as "3M Weather Stripping Cement" manufactured by Minnesota Mining and Manufacturing Company, identified as No. EC226 although EC870 is believed to be equally satisfactory inasmuch as these cements are rubber base cements.

In the gages which we have made we used copper lead wires which amalgamate with mercury to produce a good copper-mercury contact when the lead wires are inserted in the gage. While copper lead wires have the disadvantages of opening up, after a period of time, when amalgamation has progressed through the copper, yet if it is desired to have a gage for extended use or for long inventory life, then a copper clad steel or a copper plate steel wire or Nichrome or other similar alloys could be used.

An analysis of our gage is as follows: Using $$R = P\frac{L}{A}$$

for a mercury column it can easily be shown that $$\left[\frac{dR/R}{dL/L}\right]_{vol.\ const.} = g = 2$$

$R$ = Resistance
$P$ = Specific resistance (resistivity)
$L$ = Length
$A$ = Cross sectional area
$G$ = cage factor (unit change in resistance per unit change in length)

A theoretical analysis of the errors involved show three sources of errors: (1) lateral strain error in the folded gage as the gage is stretched or compressed in the longitudinal direction; (2) stray series resistance and (3) effect of the cement.

Using a Poisson's ratio of $\phi \leq \frac{1}{2}$ it can be shown that the lateral strain error for a gage $\frac{11}{32}" \times \frac{1}{2}"$ will be less than 1.4 percent.

In consideration of the second error it will be noticed that the plot of log $R$ versus log $l$ (Fig. 5) is only very slightly concave upward. This deviation from linearity is attributed to stray series resistance. Series resistance effect can be reduced until it causes an error of less than 2 percent in the determination of the strain. As an alternative the resistance can be measured and its effect completely eliminated by calculation.

The cement is a third source of error especially when dealing with highly distensible materials and products. When a structure with a gage cemented to its surface undergoes a tensile strain, the cement strains in shear. Thus the gage does not stretch as much as the structure. Since this effect occurs primarily at the ends of the gage, it is more pronounced with a short wide gage than with a long narrow one. In the non-ideal case, in which the cement strains in shear, it has been shown experimentally that $$R = KL^b$$
$$b \leq 2$$

$L$ = Gage length on structure under test where $R$ = gage resistance
$L$ = gage length on the surface to which the gage is cemented
$K$ and $b$ are constants It can easily be shown that $$\frac{dR/R}{dL/L} = b$$

In effect then $b = g$ where "$g$" is the gage factor.

It is seen, then, that this end effect is manifested simply as a reduction of gage factor. The error can therefore be completely eliminated by direct single point calibration. Fig. 5 illustrates the variation in $g$ from gage to gage.

To further illustrate the invention, five high range strain gages of different physical dimensions were cemented with "3M Weather Stripping Adhesive" to the $2" \times \frac{1}{2}" \times 12"$ strip of rubber. Bench marks were scribed on the strip. At various degrees of strain the distance between bench marks and gage resistance were measured. The results are shown in Fig. 5 wherein the curves have the same reference numbers corresponding to the gages, Fig. 4, from which the curves were taken.

Several high range strain gages have been subjected to strain varying sinusoidally from 0 to 50 percent at a frequency of twelve cycles per second for several thousand cycles without shift in calibration and without signal distortion.

From the foregoing disclosure it is seen that we have provided a relatively simple yet highly effective high range electrical resistance type strain gage having excellent accuracy in tests involving large deformations and at frequencies commonly encountered in strain measurements not only in the rubber industry but also in post-yield metallurgy and other fields where large strains are encountered.

It will, of course, be understood that various changes in details of construction and arrangements of parts and in the method outlined may be made by those skilled in the art without departing from the spirit of the invention as set forth in the appended claim.

I claim:

The method of making an electrical resistance gage for high range extension consisting in bending a wire into a grid form having substantially parallel series paths, covering the grid wire with uncured material, curing the material while in its grid shape, removing the wire whereupon the cured material retains its form as a grid shaped tube, filling the resultant grid shaped tube with a liquid whose electrical resistance varies with its extension in the direction of said parallel paths, and then inserting lead wires into the ends of the tube to make electrical contact with the liquid therein.

References Cited in the file of this patent

UNITED STATES PATENTS

| | | |
|---|---|---|
| 805,260 | Callan | Nov. 21, 1905 |
| 1,992,678 | Studt et al. | Feb. 26, 1935 |
| 2,061,863 | Wells | Nov. 24, 1936 |
| 2,359,085 | Chubb | Sept. 26, 1944 |
| 2,518,906 | Kocmich | Aug. 15, 1950 |